US010079932B2

(12) United States Patent
Rodriguez et al.

(10) Patent No.: US 10,079,932 B2
(45) Date of Patent: Sep. 18, 2018

(54) METHOD AND SYSTEM FOR LOGGING AND REPORTING CALL DETAIL INFORMATION

(71) Applicant: Vonage Business Inc., Atlanta, GA (US)

(72) Inventors: Oscar Rodriguez, Westminster, CA (US); Crisantos Hajibrahim, Irvine, CA (US)

(73) Assignee: Vonage Business Inc., Atlanta, GA (US)

( * ) Notice: Subject to any disclaimer, the term of this patent is extended or adjusted under 35 U.S.C. 154(b) by 307 days.

(21) Appl. No.: 14/926,164

(22) Filed: Oct. 29, 2015

(65) Prior Publication Data

US 2017/0126883 A1    May 4, 2017

(51) Int. Cl.
*H04M 3/22* (2006.01)
*H04M 3/42* (2006.01)
*H04L 12/58* (2006.01)

(52) U.S. Cl.
CPC .......... *H04M 3/2218* (2013.01); *H04L 51/36* (2013.01); *H04M 3/42059* (2013.01)

(58) Field of Classification Search
None
See application file for complete search history.

(56) References Cited

U.S. PATENT DOCUMENTS

| 9,112,747 | B2 | 8/2015 | Alexander et al. | |
| 2006/0215823 | A1* | 9/2006 | Gruchala | H04M 3/2218 379/93.24 |
| 2015/0120607 | A1* | 4/2015 | Ramsunder | G06Q 10/10 705/344 |
| 2016/0219085 | A1* | 7/2016 | Jacobson | H04L 65/1069 |

FOREIGN PATENT DOCUMENTS

GB          2427795 A * 1/2007 ............ H04M 15/00

* cited by examiner

*Primary Examiner* — Harry S Hong
(74) *Attorney, Agent, or Firm* — Moser Taboada; Joseph Pagnotta (57) ABSTRACT

A method and apparatus for logging call detail information in an email message are provided herein. The method for logging call detail information in an email message includes (i) receiving, from a service provider, information associated with a first call event for a telecommunication session; (ii) creating a call record using the information associated with the first call event for the telecommunication session; (iii) receiving, from the service provider, information associated with an additional call event for the telecommunication session; (iv) updating the call record using the information associated with the additional call event; (v) repeating steps (iii) and (iv) until the information associated with one of the additional call events indicates the telecommunication session has ended; and (vi) sending a request to insert the call record into a user's email account using one or more email provider application programming interfaces (APIs).

22 Claims, 3 Drawing Sheets

METHOD AND SYSTEM FOR LOGGING AND REPORTING CALL DETAIL INFORMATION

BACKGROUND

Field

Embodiments of the present invention generally relate to methods and systems for unifying communication information with business applications, and more specifically, to logging and reporting call detail information.

Description of the Related Art

Business management systems maintain significant amounts of information regarding employees, contacts, accounts, customer service tickets and the like. Each telecommunication session involving an employee may relate to either an account or a potential business opportunity. However, due to the volume of calls made from a business, manually tracking and recording the details of each telecommunication session and relating each to a specific account is tedious work. While, currently, call logs may be exported by an employee's computer and stored by a business management system; however, bulk exporting of information does not organize the call information is a useful manner.

Therefore, there exists a need in the art for an improved method and system for logging and reporting call detail information.

SUMMARY

A method and system for logging call information in an email message is provided herein. In some embodiments, a method for logging call information in an email message may include receiving, from a service provider, information associated with a call event for a telecommunication session; creating and updating a call record using the received call event information and information from additional call events received for the telecommunication session; and when the call event information indicates that the telecommunication session has ended, sending a request to insert the call record into a user's email account using one or more email provider application programming interfaces (APIs).

In some embodiments, a system for logging call information in an email message may include a call event script configured to process call event information from a service provider for a telecommunication session; and a call record generator configured to create and update a call record with call event information received from the service provider, and send a request to insert the call record into a user's email account using one or more email provider application programming interfaces (APIs).

Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention generally relate to a method and system for logging and reporting call detail information. In some embodiments, call detail information is logged and reported by an email message. In some embodiments, a unified communication server subscribes to notifications of call events from a service provider. As information regarding call events associated with a telecommunication session is received, a call detail record for the telecommunication session is created and updated. When the information associated with the call event indicates that the telecommunication session has ended, the call detail record is communicated to a business management service associated with one of a caller or callee of the telecommunication session by sending a request to insert to the call detail record into the email account of the user. In some embodiments, GOOGLE Gmail™ application programming interfaces (APIs) are used to insert the call detail record into a user's Gmail account, thereby causing the call log record to appear in the user's Gmail™ account as an email message. The call detail email may be organized within the user's Gmail™ account based on a type of call (e.g., voice calls, inbound calls, outbound calls, and missed calls).

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
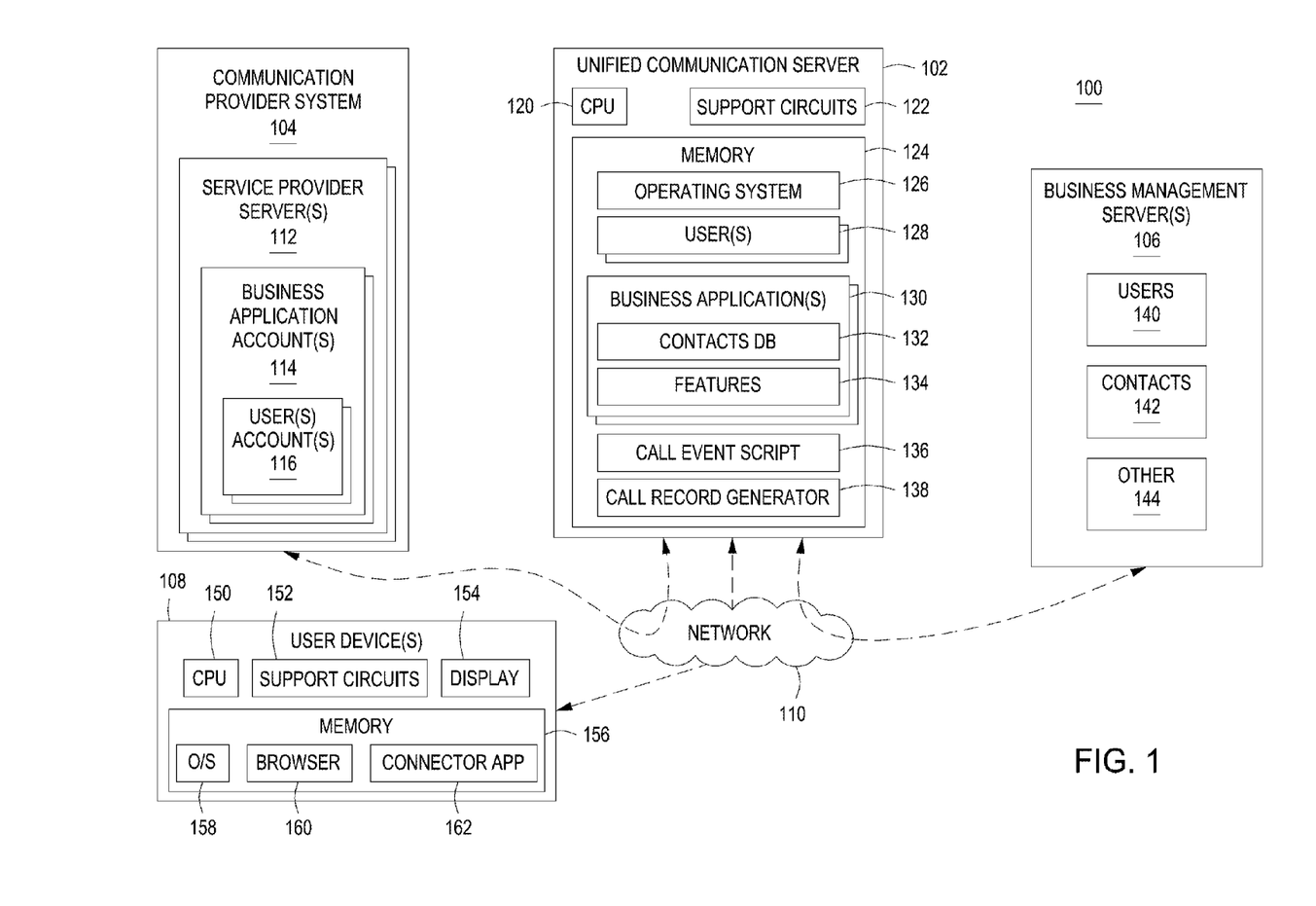
FIG. 1 depicts a block diagram of a communications system provided to facilitate information sharing for business applications, according to one or more embodiments of the invention.

FIG. 1 depicts a block diagram of a communications system 100 provided to facilitate information sharing for business applications, according to one or more embodiments of the invention. The communications system 100 includes a unified communication server 102, a communication provider system 104, a plurality of business management servers 106, and a plurality of user devices 108, communicatively coupled via network 110.

A communication provider system 104 is a call processing system that processes communications. The communication provider system 104 includes one or more service provider servers 112 associated with one or more different service providers, for example carriers, hosted VoIP providers, and cloud PBX providers. The communication provider system 104 is responsible for handling communications (e.g., call processing of calls, etc.) to and from the plurality of user devices 108. In embodiments consistent with the present invention, the communication provider system 104 may be any call processing system that provides an interface or API for obtaining call detail information associated with its subscribers. The communication provider system 104 maintains an account for each business application 114 as well as for each user 116 of the business application 114. A user 116 may be associated with more than one business application 114.

The business management servers 106 each serve a cloud-based business application, such as a customer relationship management service (e.g., Salesforce® or Zoho®), a project management service (e.g., Clio®), a customer support service (e.g., Zendesk®), a billing service, a collaboration service, and the like. Each business application is associated with a service provider in the communication provider system 104. Each business application is associated with a plurality of users 140 and contacts 142, as well as other business specific items 144. For example, a customer relationship management business application may also include accounts, clients, sales opportunities, customer activity, support tickets, and the like.

The unified communication server 102 facilitates the call control between the user device 108 and the communication provider system 104. The unified communication server 102 also facilitates the consolidation and sharing of information between the communication provider system 104, user device 108, and the business management servers 106. The unified communication server 102 may comprise a Central Processing Unit (CPU) 120, support circuits 122, and a memory 124. The CPU 120 may comprise one or more commercially available microprocessors or microcontrollers that facilitate data processing and storage. The various support circuits 122 facilitate the operation of the CPU 120 and include one or more clock circuits, power supplies, cache, input/output device and circuits, and the like. The memory 124 comprises at least one of Read Only Memory (ROM), Random Access Memory (RAM), disk drive storage, optical storage, removable storage and/or the like. In some embodiments, the memory 124 comprises an operating system 126, a plurality of user accounts 128, a plurality of business application accounts 130, a call event script 136 for processing call events received from the communication provider system 104 and a call record generator 138. For each business application 130, the unified communication server 102 maintains a database of contacts 132 and features 134 subscribed to by the business application 130. Features may include call logging, contact searching, whether to export all call information or only calls with call information that matches a contact, and the like. The unified communication server 102 periodically synchronizes the contact database 132 with each of the business management servers 106. The unified communication server 102 subscribes to call events (e.g., call ringing, answered, on hold, in progress, call ended, missed call) from the communication provider system 104 for communications to and from user device 108.

The operating system (OS) 126 generally manages various computer resources (e.g., network resources, file processors, and/or the like). The OS 126 is configured to execute operations on one or more hardware and/or software modules, such as Network Interface Cards (NICs), hard disks, virtualization layers, firewalls and/or the like. Examples of the OS 126 may include, but are not limited to, various versions of LINUX, MAC OSX, BSD, UNIX, MICROSOFT WINDOWS, IOS, ANDROID and the like.

The user device 108 may comprise a Central Processing Unit (CPU) 150, support circuits 152, a display 154, and a memory 156. The CPU 150 may comprise one or more commercially available microprocessors or microcontrollers that facilitate data processing and storage. The various support circuits 152 facilitate the operation of the CPU 150 and include one or more clock circuits, power supplies, cache, input/output device and circuits, and the like. The memory 156 comprises at least one of Read Only Memory (ROM), Random Access Memory (RAM), disk drive storage, optical storage, removable storage and/or the like. In some embodiments, the memory 156 comprises an operating system 158, a browser 160, and a connector app 162, such as a CHROME™ browser extension. The connector app 162 enables the user device 108 to connect with the unified communication server 102. Through the connector app 162, the user may place calls, answer calls, end calls, see a call history for the user, see call status events, view their user profile, favorite contacts, and/or receive contact search assistance. The connector app 162 also enables a user to modify account settings, such as allow the user's call log to be visible by other users, modify the user's name, or update the user's time zone or preferred language. A new user is associated with at least one business application. The new user registers with the unified communication server 102. When the new user's registration is verified, the unified communication server 102 creates a subscription, such as an Xtended Services Interface (XSI) subscription to the service provider's service to receive notifications of call events.

When a user of user device 108 wishes to place a call, the user may enter the callee information (e.g., name, phone number, email) in the connector app 162. As the user enters information, the unified communication server 102 receives the entered callee information via real-time call events, for example, XSI events. XSI events are used for notifications of real-time call events. As such, the unified communication server 102 can monitor the callee information as it is entered. The unified communication server 102 searches the contact databases 132 for entries matching the entered information and, if found, sends the contact information back to the user's browser 160.

The user may select a contact or simply select an option to start the call. When the unified communication server 102 receives the command to start the call, the unified communication server 102 sends the call control information (e.g., user information, telephone identifier) to the communication provider system 104 via an API. After confirming that the user is a valid subscriber to a service provider 112, the communication provider system 104 initiates the call. The communication provider system 104 initiates the call by for example, calling the user back on their softphone, cell phone, desk phone, or any device 108 specified by the user when the user account was configured (or at some other time subsequent to account configuration). Although the user may place the call via the connector app 162, the user may alternatively place the call using a different device. As long as the user is logged into the user's account 116 on the communication provider system 104, the unified communication server 102 receives notifications of call events for the call and the call is captured in a user's call log. Advantageously, an incoming call is captured even when the user device 108 is off-line or when the connector app 162 is uninstalled.

Subscribers of the unified communication server 102 may subscribe to communication events (e.g., call detail information related to call events) associated with communications the user is associated with (e.g., calls the user made or received). If a user account is configured to receive such call event information, the communication provider system 104 sends communication detail information related to the communication event. In some embodiments, the communication provider system 104 may send real-time XSI XML events as POST data reporting each call event. Although XML events are described, it will be appreciated that any format may be used to report the call event, such as JSON and the like. As each call event is received, the unified communication server 102 runs a call event script 136. In some embodiments, the call event script 136 may be a PHP script or other type of executable script. The call event script 136 will first determine whether the received event is tied to a user 128 and if so, whether the user 128 has an active subscription to the unified communication server's service. If the user does not have an active subscription, the unified communication server 102 sends an error message to the communication provider system 104 that in turn, terminates the user's subscription on the communication provider system 104, thereby cancelling the notification of call events to the unified communication server 102.

However, if the user 128 has an active subscription, the call record generator 138 creates a call detail record for the call. In some embodiments, a configuration file or user profile may be checked to determine if the user has requested to receive call detail information for the call before creating the record. In addition, the unified communication server 102 sends a PUSH notification to the user's browser. In some embodiments, the unified communication server 102 uses a third-party PUSH notification service (not shown) to deliver the PUSH notifications. Each call event is sent to the user device 108 and displayed in the user's browser 160 on display 154. In some embodiments, screen pop information is sent to the user's browser 160 using Google Chrome's rich notification API. Rich notifications enable the display of a title, body, and buttons on an always-on-top screen pop. For example, on an incoming screen pop, a display may include: a title, "Incoming call from", a body "John Smith or 8005551234", a first button "Answer", and a second button "Decline and send to voicemail". Throughout the call, through the connector app 164 the user may add tags or notes to a call log for the call, relate the call to an account or business opportunity, or utilize other features specific to the business application with which the call is associated.

A user may also add one or more labels to the call log. The labels are used by Google Gmail to organize call logs based on the label. When a user first installs the connector app 164, labels are automatically created for labeling call logs using, for example a Google Gmail API for creating labels (e.g., Users.labels:create). The labels include voice calls/incoming, voice calls/missed, and voice calls/outbound. One of these labels is automatically assigned to the call log based on whether the call was incoming, missed, or outgoing. When the user logs into their Gmail account, their call logs are organized based on the label. The user may create and/or assign additional custom labels to a call log. For example, a user may create a different label for each customer such that the user's call logs are organized based on the customer label assigned to the call log.

From a call log window, the user may enter a label for the current call. A list of labels is retrieved using for example the Google Gmail API for getting a list of the user's labels (e.g., Users.labels.get). If the entered label exists in the retrieved list of labels, the user may assign the label to the call log. If the entered label does not exist in the retrieved list of labels, the user may be prompted to create the label such that the label may be assigned to the call log. As user may assign multiple labels to a call log. The user's call log is exported periodically to the business management server 106 via the unified communication server 102.

When an incoming call is received by a service provider server 112, the call event is sent to the unified communication server 102. In some embodiments, a contact search is performed. The contacts database 132 is searched for information regarding the caller. If contact information is found in the contacts database 132, the caller information as well as the call event are pushed to the user's browser 160, where the user may answer the call or select an option to send the call to voicemail. The call events are added to a call log for the user.

Figure 2:
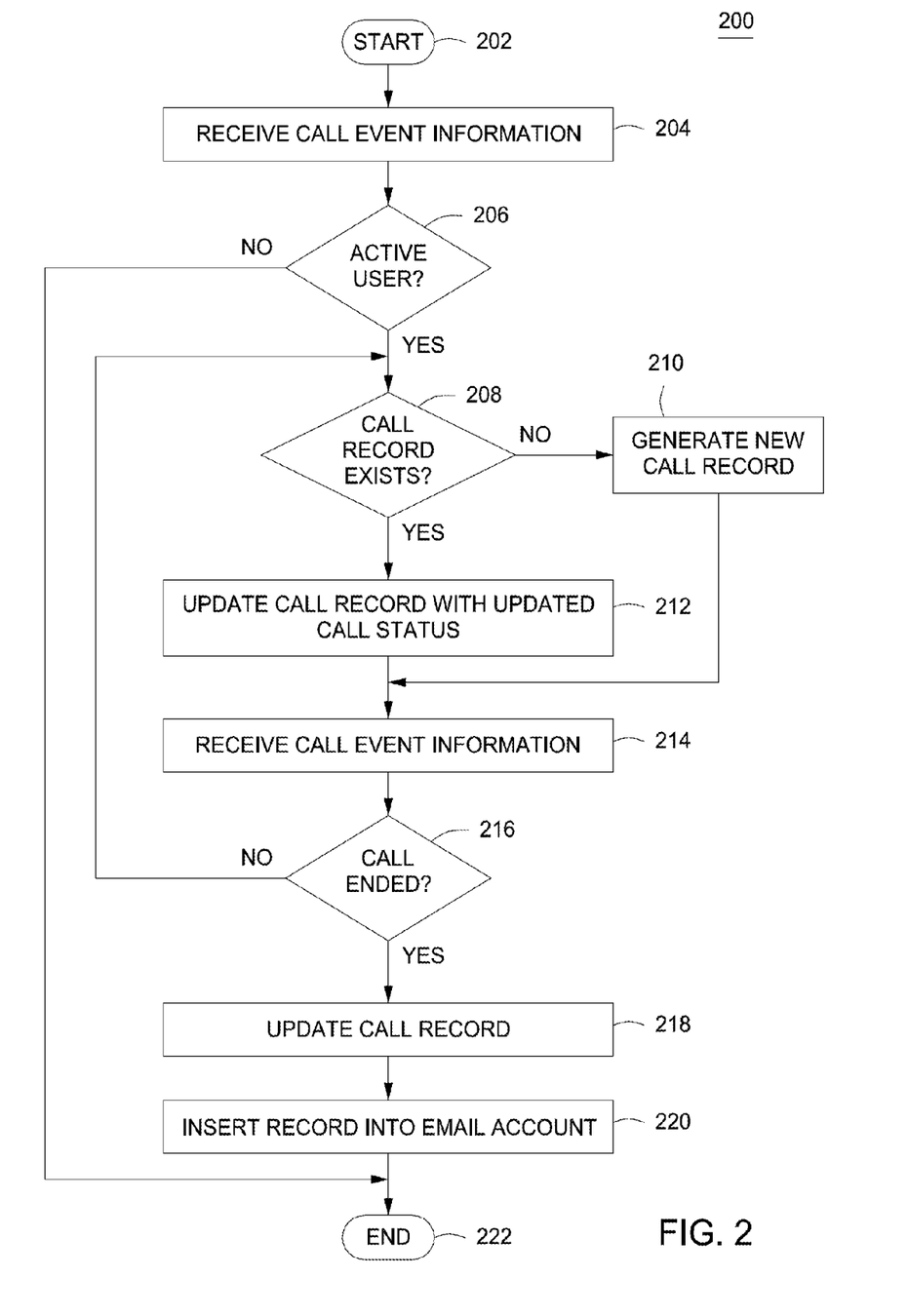
FIG. 2 depicts a flow diagram of a method for logging call information in an email message, according to one or more embodiments of the invention.

FIG. 2 depicts a flow diagram of method 200 for logging call information in an email message, according to one or more embodiments of the invention. The method 200 starts at step 202 and proceeds to step 204.

At step 204, call event information is received from a service provider. A call event may be for example, call ringing, answered, on hold, call ended, and the like. The call event information may also indicate whether the call is an incoming or outgoing call.

At step 206, it is determined if the user associated with the call is an active user. The user is considered active if the user maintains a subscription with a unified communication service. If the user is active, the user will have an entry in a database of users that is maintained by the unified communication server. If it is determined that the user is not active, optionally, an error message may be sent to the service provider indicating that the user does not have a subscription and the method 200 ends at step 222.

However, if at step 206 it is determined that the user is active, at step 208 it is determined whether a call record has been created for the call. If no call record exists for the call, at step 210, a call record is generated for the call and the method 200 proceeds to step 214. However, if at step 208, it is determined that a call record exists, at step 212, the call record is updated with the current call information. At step 214, additional call event information is received for the call. At step 216, it is determined whether the call event information indicates that the call has ended. If the call information does not indicate that the call has ended, the method 200 proceeds to step 208 and iterates until the call event information indicates that the call has ended at which time the method 200 proceeds to step 218.

At step 218, the call record is updated with the call record information indicating that the call has ended. The call record includes at least a phone number dialed (or calling), a start time of the call, an end time of the call, a call direction (e.g., incoming or outgoing), and a call duration. The call record may also include a label that corresponds to a call time, wherein the label includes one of voice call, inbound call, outbound call, or missed call. The label may be used by an email application, for example GOOGLE Gmail™ application to sort the call records based on the call type.

The call record may also include user added information, such as a subject, notes, tags, labels, and the like. At step 220, the call record is inserted into the user's email account by sending a request to insert to the call detail record into the email account of the user. In some embodiments, sending a request includes calling GOOGLE Gmail™ application programming interfaces (APIs), for example a Google Gmail API for inserting a message (e.g., Users.messages:insert) to insert the call detail record directly into a user's Gmail™ account, thereby causing the call log record appears in the user's Gmail™ account as an email message. In some embodiments, other APIs may be used in order to export call log information as an activity or communication to a business application. The method 200 ends at step 222.

Figure 3:
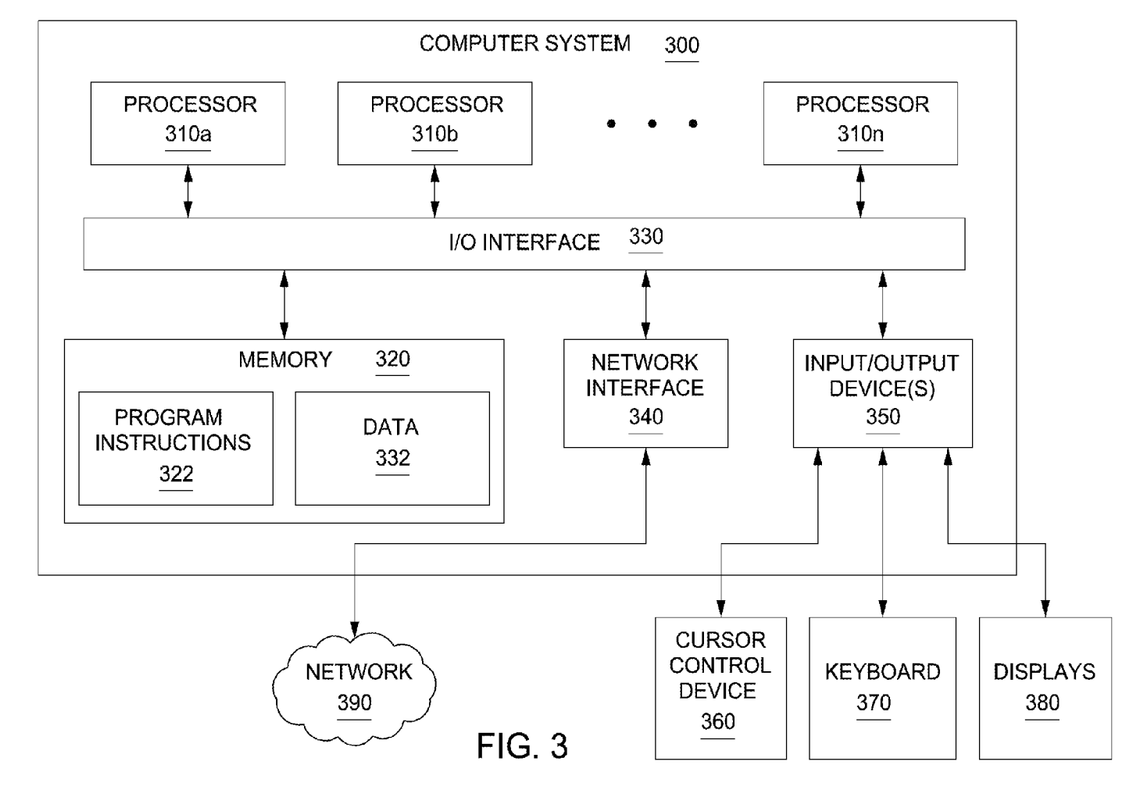
FIG. 3 depicts a computer system that can be utilized in various embodiments of the present invention to implement the computer and/or the display, according to one or more embodiments of the invention.

FIG. 3 depicts a computer system 300 that can be utilized in various embodiments of the present invention to implement the computer and/or the display, according to one or more embodiments.

Various embodiments of method and apparatus for routing calls based upon internal network conditions and/or external carrier network information, as described herein, may be executed on one or more computer systems, which may interact with various other devices. One such computer system is computer system 300 illustrated by FIG. 3, which may in various embodiments implement any of the elements or functionality illustrated in FIGS. 1-2. In various embodiments, computer system 300 may be configured to implement methods described above. The computer system 300 may be used to implement any other system, device, element, functionality or method of the above-described embodiments. In the illustrated embodiments, computer system 300 may be configured to implement method 200 as processor-executable executable program instructions 322 (e.g., program instructions executable by processor(s) 310) in various embodiments.

In the illustrated embodiment, computer system 300 includes one or more processors 310*a*-310*n* coupled to a system memory 320 via an input/output (I/O) interface 330. Computer system 300 further includes a network interface 340 coupled to I/O interface 330, and one or more input/output devices 350, such as cursor control device 360, keyboard 370, and display(s) 380. In various embodiments, any of the components may be utilized by the system to receive user input described above. In various embodiments, a user interface may be generated and displayed on display 380. In some cases, it is contemplated that embodiments may be implemented using a single instance of computer system 300, while in other embodiments multiple such systems, or multiple nodes making up computer system 300, may be configured to host different portions or instances of various embodiments. For example, in one embodiment some elements may be implemented via one or more nodes of computer system 300 that are distinct from those nodes implementing other elements. In another example, multiple nodes may implement computer system 300 in a distributed manner.

In different embodiments, computer system 300 may be any of various types of devices, including, but not limited to, personal computer systems, mainframe computer systems, handheld computers, workstations, network computers, application servers, storage devices, a peripheral devices such as a switch, modem, router, or in general any type of computing or electronic device.

In various embodiments, computer system 300 may be a uniprocessor system including one processor 310, or a multiprocessor system including several processors 310 (e.g., two, four, eight, or another suitable number). Processors 310 may be any suitable processor capable of executing instructions. For example, in various embodiments processors 310 may be general-purpose or embedded processors implementing any of a variety of instruction set architectures (ISAs). In multiprocessor systems, each of processors 310 may commonly, but not necessarily, implement the same ISA.

System memory 320 may be configured to store program instructions 322 and/or data 332 accessible by processor 310. In various embodiments, system memory 320 may be implemented using any suitable memory technology, such as static random access memory (SRAM), synchronous dynamic RAM (SDRAM), non-volatile/Flash-type memory, or any other type of memory. In the illustrated embodiment, program instructions and data implementing any of the elements of the embodiments described above may be stored within system memory 320. In other embodiments, program instructions and/or data may be received, sent or stored upon different types of computer-accessible media or on similar media separate from system memory 320 or computer system 300.

In one embodiment, I/O interface 330 may be configured to coordinate I/O traffic between processor 310, system memory 320, and any peripheral devices in the device, including network interface 340 or other peripheral interfaces, such as input/output devices 350. In some embodiments, I/O interface 330 may perform any necessary protocol, timing or other data transformations to convert data signals from one component (e.g., system memory 320) into a format suitable for use by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. Also, in some embodiments some or all of the functionality of I/O interface 330, such as an interface to system memory 320, may be incorporated directly into processor 310.

Network interface 340 may be configured to allow data to be exchanged between computer system 300 and other devices attached to a network (e.g., network 390), such as one or more external systems or between nodes of computer system 300. In various embodiments, network 390 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 340 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 350 may, in some embodiments, include one or more display terminals, keyboards, keypads, touchpads, scanning devices, voice or optical recognition devices, or any other devices suitable for entering or accessing data by one or more computer systems 300. Multiple input/output devices 350 may be present in computer system 300 or may be distributed on various nodes of computer system 300. In some embodiments, similar input/output devices may be separate from computer system 300 and may interact with one or more nodes of computer system 300 through a wired or wireless connection, such as over network interface 340.

In some embodiments, the illustrated computer system may implement any of the methods described above, such as the methods illustrated by the flowchart of FIG. 2. In other embodiments, different elements and data may be included.

Those skilled in the art will appreciate that computer system 300 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 300 may be transmitted to computer system 300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer-implemented method for consolidating call events between a user, a service provider, and a business application, comprising:
   (i) receiving from a user device, information associated with a business application contact;
   (ii) searching a contact database for one or more entries matching the business application contact;
   (iii) transmitting the one or more entries to the user device;
   (iv) receiving from the user device an option to initiate a telecommunication session with one of the one or more entries matching the business application contact;
   (v) transmitting call control information to the service provider;
   (vi) receiving, from the service provider, information associated with a first call event for the telecommunication session;
   (vii) creating a call record using the information associated with the first call event for the telecommunication session;
   (viii) receiving, from the service provider, information associated with an additional call event for the telecommunication session;
   (ix) updating the call record using the information associated with the additional call event;
   (x) repeating steps (viii) and (ix) until the information associated with one of the additional call events indicates the telecommunication session has ended; and
   (xi) sending a request to insert the call record into a user's email account using one or more email provider application programming interfaces (APIs).

2. The method of claim 1, wherein the call event information associated with the first call event and each additional call event includes at least one of call ringing, answered, on hold, in progress, call ended, missed call, number dialed or number calling.

3. The method of claim 1, further comprising:
calculating a call duration; and
updating the call record with the calculated call duration.

4. The method of claim 1, further comprising subscribing to call events from the service provider.

5. The method of claim 1, further comprising sending a PUSH notification directed to a user indicating a call event for the telecommunication session.

6. The method of claim 1, further comprising:
receiving additional information associated with the telecommunication session, wherein additional information includes at least one of a tag, a note, an account associated with the telecommunication session, a business opportunity associated with the telecommunication session, or a customer service ticket number associated with the telecommunication session; and
updating the call record with the additional information associated with the telecommunication session.

7. The method of claim 1, further comprising determining a business management service that is associated with at least one of a callee or a caller of the telecommunication session.

8. The method of claim 1, further comprising:
identifying a label for the telecommunication session, wherein the label includes one of inbound call, outbound call, or missed call; and
updating the call record with the identified label.

9. The method of claim 1, further comprising:
receiving a request to create one or more custom labels;
generating the one or more custom labels using an email provider API;
assigning the one or more custom labels to a call log; and
updating the call record with the one or more custom labels.

10. A unified communication system for consolidating call events between a user, a service provider, and a business application, comprising:
a) at least one processor;
b) at least one input device; and
c) at least one storage device storing processor-executable instructions which, when executed by the at least one processor, perform a method including:
transmitting call control information to the service provider based on received callee information and a request to start a telecommunication session, wherein the callee information is information associated with a business application contact received from a user device,
processing call event information received from the service provider for the telecommunication session; and
creating and updating a call record with the call event information received from the service provider, and sending a request to insert the call record into a user's email account using one or more email provider application programming interfaces (APIs).

11. The system of claim 10, wherein the call event information associated with a first call event and each additional call event includes at least one of call ringing, answered, on hold, in progress, call ended, missed call, number dialed or number calling.

12. The system of claim 10, wherein the processor-executable instructions, when executed, perform the method further comprising:
calculating a call duration; and
updating the call record with the calculated call duration.

13. The system of claim 10, wherein the processor-executable instructions, when executed, perform the method further comprising sending a PUSH notification directed to a user indicating each call event for the telecommunication session.

14. The system of claim 10, wherein the processor-executable instructions, when executed, perform the method further comprising:
receiving additional information associated with the telecommunication session, wherein additional information includes at least one of tags, notes, an account associated with the telecommunication session, a business opportunity associated with the telecommunication session, or a customer service ticket number associated with the telecommunication session; and
updating the call record with the additional information associated with the telecommunication session.

15. The system of claim 10, wherein the processor-executable instructions, when executed, perform the method further comprising determining a business management service that is associated with at least one of a callee or a caller of the telecommunication session.

16. The system of claim 10, wherein the processor-executable instructions, when executed, perform the method further comprising:
identifying a label for the telecommunication session, wherein the label includes one of voice call, inbound call, outbound call, or missed call; and
updating the call record with the identified label.

17. The system of claim 10, wherein the processor-executable instructions, when executed, perform the method further comprising:
receiving a request to create one or more custom labels;
generate the one or more custom labels using an email provider API;
assigning the one or more custom labels to a call log; and
updating the call record with the one or more custom labels.

18. A non-transitory computer readable medium for storing computer instructions that, when executed by at least one processor causes the at least one processor to perform a method for consolidating call events between a user, a service provider, and a business application, comprising:
(i) receiving from a user device, information associated with a business application contact;
(ii) searching a contact database for one or more entries matching the business application contact;
(iii) transmitting the one or more entries to the user device;
(iv) receiving from the user device an option to initiate a telecommunication session with one of the one or more entries matching the business application contact;
(v) transmitting call control information to the service provider;
(vi) receiving, from the service provider, information associated with a first call event for the telecommunication session;
(vii) creating a call record using the information associated with the first call event for the telecommunication session;
(viii) receiving, from the service provider, information associated with an additional call event for the telecommunication session;
(ix) updating the call record using the information associated with the additional call event;

(x) repeating steps (viii) and (ix) until the information associated with one of the additional call events indicates the telecommunication session has ended; and (xi) sending a request to insert the call record into a user's email account using one or more email provider application programming interfaces (APIs).

19. The computer readable medium of claim 18, wherein the call event information associated with the first call event and each additional call event includes at least one of call ringing, answered, on hold, in progress, call ended, missed call, number dialed or number calling.

20. The computer readable medium of claim 18, further comprising:

calculating a call duration; and updating the call record with the calculated call duration.

21. The computer readable medium of claim 18, further comprising sending a PUSH notification directed to a user indicating a call event for the telecommunication session.

22. The computer readable medium of claim 18, further comprising:

receiving additional information associated with the telecommunication session, wherein additional information includes at least one of tags, notes, labels, an account associated with the telecommunication session, a business opportunity associated with the telecommunication session, or a customer service ticket number associated with the telecommunication session;

updating the call record with the additional information associated with the telecommunication session;

determining a business management service that is associated with one of a callee or a caller of the telecommunication session; and sending a request to insert the call record into a user's email account using one or more email provider application programming interfaces (APIs).

* * * * *